(No Model.)

T. W. HILL.
PLANTER.

No. 371,459. Patented Oct. 11, 1887.

WITNESSES:
Fred G. Dieterich
John C. Kenion

INVENTOR:
T. W. Hill
BY Munn & Co.
ATTORNEYS.

UNITED STATES PATENT OFFICE.

THEODORE WALCOTT HILL, OF SMITHLAND, LOUISIANA.

PLANTER.

SPECIFICATION forming part of Letters Patent No. 371,459, dated October 11, 1887.

Application filed April 28, 1887. Serial No. 236,501. (No model.)

*To all whom it may concern:*

Be it known that I, THEODORE WALCOTT HILL, of Smithland, Pointe Coupée parish, and State of Louisiana, have invented a new and useful Improvement in Planters, of which the following is a specification.

This invention pertains to improvements in planters for depositing in the ground cotton-seed, corn, and peas; and it consists of the combinations of parts, including their construction, substantially as hereinafter set forth, and pointed out in the claims.

Figure 1:
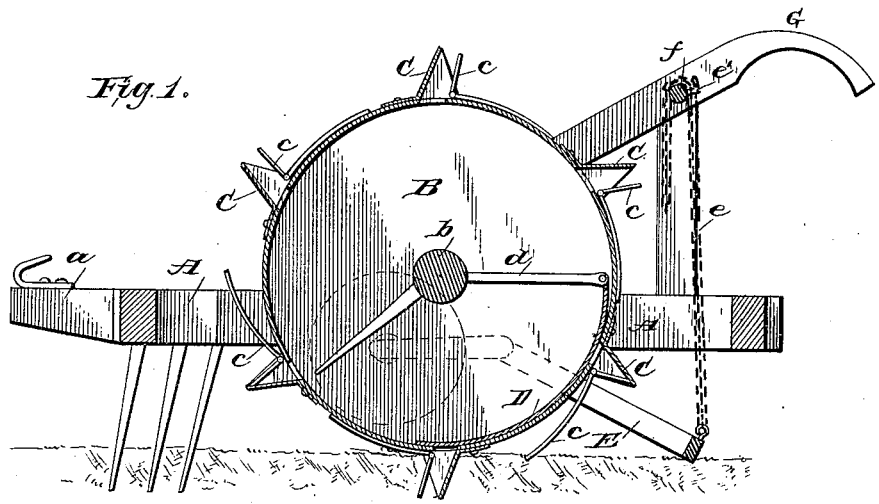
Figure 2:
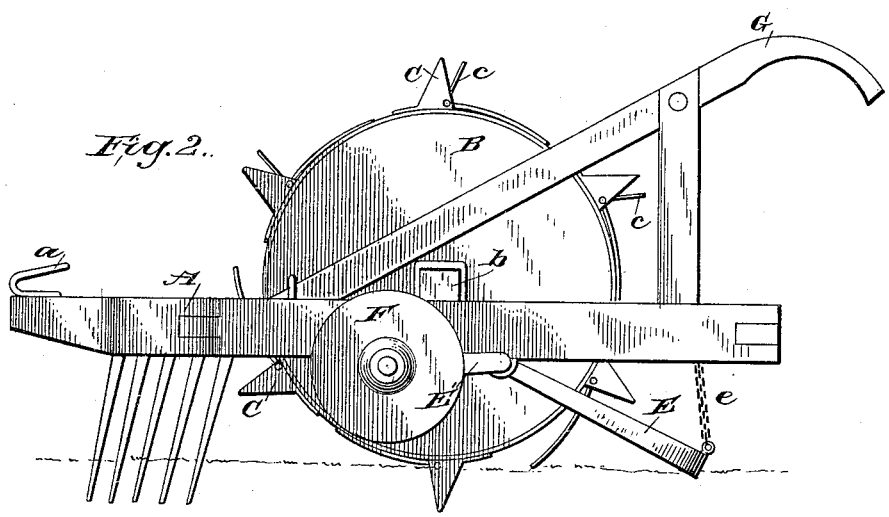
Figure 3:
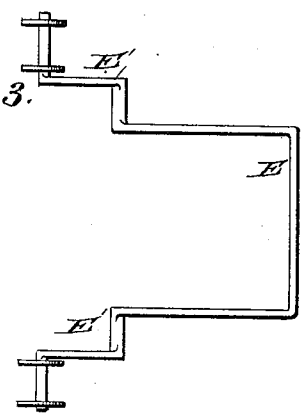

In the accompanying drawings, Figure 1 is a sectional elevation of my invention. Fig. 2 is a side view thereof, and Fig. 3 is a detailed plan view of the same.

In carrying out my invention I employ a frame, A, the front end of which is preferably tapered and provided with a forwardly-projecting draft-bar, $a$. From the under side of the tapered portion of the frame A and the draft-bar $a$ depends a series of harrow-teeth to effect the pulverizing of the earth. Hung within the frame A, upon a fixed shaft, $b$, is a revoluble seed drum or receptacle, B, which is provided at suitable intervals apart upon its circumference with a series of seed-depositing chutes, C, being disposed in alignment with seed-openings in the drum or receptacle. Over these seed-openings, upon the inside of the drum or receptacle, are designed to be arranged seed-regulating slides specially intended for use in planting corn and peas. The chutes C are tapered toward their outer ends, in order to enable them to readily enter or penetrate the earth previously plowed, and are each provided with a valve, $c$, consisting of an approximately right-angled lever-like plate pivoted at its angle to the inner corners of the chute, at the open side of the latter, and having one arm or wing adapted to fit within and open and close said side of the chute, while the other arm or wing is curved to conform to the curvature of the circumference of the seed drum or receptacle. It will be seen, therefore, that when the drum or receptacle is revolved the one arm or wing of the valves will by gravity close the open side of the chute as they are on their downward course, and thus prevent the premature discharge of the seed therefrom, and that the seed will be retained therein until the chutes have entered or penetrated the ground. At the instant a chute has reached its deepest point of penetration the other arm or wing of the valve will, by its contact with the ground and the drum or receptacle, be so actuated as to throw the valve proper away from and thus open the chute, effecting the deposit of the seed at the desired point in the ground, while at the same time the drum will cover up the seed in the ground. Within the seed drum or receptacle B, fastened to the shaft $b$, preferably by two rods, $d\ d$, is a curved plate or cut-off, D, which is so disposed as to prevent, after the seed-chutes are full, the accumulation of the seed thereat.

E is a frame or drag, its rear end or portion normally resting upon the ground in rear of the seed drum or receptacle B. The inner ends of the side bars of the frame E are formed or provided with double-cranked extensions E', comprising inner crank-arms journaled upon the under side of the frame A, and provided with longitudinal portions inclined forward and downward, and having at their forward lower ends crank-arms which serve as axles bearing the transporting-wheels F F.

To the rear end or portion of the drag or frame E is connected a chain or cord, $e$, which may be caught or looped upon a pin or projection, $e'$, upon the connecting bar or rod $f$ of the handles G.

It will be seen that when the machine is in operation, at which time the drag will rest on the ground, the transporting-wheels will be sustained by the weight of the drag in an elevated position out of contact with the ground, while when it is desired to put the machine out of operation previous to transporting the same from place to place the chain or cord is drawn upon upward and taken up a number of links and caught upon the pin or projection $e'$ of the connecting bar or rod of the handles, elevating the drag and lowering the wheels, which will in turn elevate the seed drum and its supporting-frame.

Having thus fully described my invention, what I claim, and desire to secure by Letters Patent, is—

1. In a planter, the combination, with the drum or receptacle having tapered chutes provided with valves, each consisting of an approximately right-angled lever-like plate pivoted at its angle to the inner corner of a chute, and having one arm adapted to open and close the open side of the chute, while its other arm is curved to conform to the curvature of the circumference or periphery of the drum or receptacle, substantially as shown and described.

2. In a planter, the combination, with the seed drum or receptacle, of the curved cut-off or plate connected fixedly to a shaft supported upon the carrying-frame, said cut-off being arranged upon and conforming to the inside of the circumference of the drum or receptacle, to prevent the accumulation of the seed at the seed-depositing chutes, substantially as set forth.

3. In a planter, the combination, with the carrying-frame, of the drag provided at the forward ends of its side bars with double-cranked extensions journaled upon the under side of said frame and bearing the transporting-wheels, said extensions being inclined forward and downward, substantially as and for the purpose specified.

4. In a planter, the combination, with the carrying-frame, of the drag provided with the double-cranked extensions journaled upon the under side of the said frame and bearing the transporting-wheels, said extensions being inclined forward and downward, and the manipulating chain or cord connected to said drag and caught upon a pin or projection upon the connecting bar or rod of the planter-handles, substantially as and for the purpose specified.

THEODORE WALCOTT HILL.

Witnesses:
VIDAL J. DUFOUR,
FRANCIS J. QUINLAN.